UNITED STATES PATENT OFFICE.

ORAZIO LUGO, OF NEW YORK, N. Y.

PRODUCING SOLID COMPOUNDS RESEMBLING VULCANITE FROM HAIR, &c.

SPECIFICATION forming part of Letters Patent No. 343,590, dated June 15, 1886.

Application filed November 5, 1885. Serial No. 181,914. (Specimens.)

*To all whom it may concern:*

Be it known that I, ORAZIO LUGO, a citizen of the United States, residing in the city, county, and State of New York, have invented certain new and useful Improvements in Producing Solid Compounds Resembling Vulcanite from Hair, &c.; and I do hereby declare the following to be a description of the invention.

Heretofore disintegrated horns, hoofs, and hair have been used mostly for agricultural purposes or as a mixture with cement to bind the mixture together.

The object of my invention is to produce from a material never before used for the purpose, ready at hand, and of abundant source, a vulcanite or a substance resembling vulcanite, celluloid, or the like, and possessed of all the requisite properties and qualities of common vulcanite, which substance shall be of ready manufacture and comparatively inexpensive in production, supplying a new article of trade.

My invention consists in subjecting clean hair to the simultaneous action of heat and pressure, whereby a solid substance, resembling and possessed of the properties and qualities of common vulcanite, celluloid, or the like may be produced of any desirable form, shape, or kind.

To carry my invention into effect I take hair of any kind and free it from extraneous matter, particularly from oily or fatty substance, in any suitable and convenient manner, and place it in suitable quantities in an appropriate and sufficiently strong vessel and subject it to considerable pressure, preferably under a hydraulic press, at the same time heating it to about 200° Fahrenheit, adding more of material, as requisite, and again subjecting to pressure and heat until a more or less compact mass is formed. This will occupy but a few minutes. I then raise the temperature to about 300° Fahrenheit, the vessel being kept under sufficient pressure to keep it firmly closed, or direct pressure being brought to bear upon the material, and the heat being continued for the space of from one to three hours, according to the degree of hardness which it is desired to impart to the material, the longer the material being kept under treatment the harder it will become.

It is obvious that steam-heat may be employed, and that suitable pressure as well as heat may be supplied by steam under requisite tension. By this means I produce a solid and compact product, which resembles the common vulcanites produced from india-rubber and sulphur, and without the addition of any other materials, the product being of any desired degree of hardness and elasticity, according to the length of time and the degree of heat and pressure employed.

The new product of my invention can be worked in any manner, turned or polished, as horn, hard rubber, or common vulcanite or celluloid are now treated, and can be applied to all the uses in the arts in which they are employed.

It is obvious that the admixture of other substances or coloring-matter or any suitable ingredient or ingredients with the hair would fall within my invention.

Having thus described my invention, what I claim, and desire to secure by Letters Patent, is—

1. The mode of producing a vulcanite or substance resembling vulcanite or celluloid, which consists in subjecting hair to heat and pressure, substantially as described.

2. A vulcanite or substance resembling vulcanite, celluloid, or the like, made with or containing hair, substantially as described.

ORAZIO LUGO.

Witnesses:
JAMES THOMSON,
ALLAN L. PURVES.